United States Patent
Cho et al.

(10) Patent No.: US 8,148,953 B2
(45) Date of Patent: Apr. 3, 2012

(54) APPARATUS AND METHOD FOR RECYCLING AND REUSING CHARGE IN AN ELECTRONIC CIRCUIT

(75) Inventors: Choongyeun Cho, Hopewell Junction, NY (US); Daeik Kim, White Plains, NY (US); Jonghae Kim, Fishkill, NY (US); Moon Ju Kim, Wappingers Falls, NY (US); James Randal Moulic, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 1132 days.

(21) Appl. No.: 11/946,550

(22) Filed: Nov. 28, 2007

(65) Prior Publication Data

US 2009/0134844 A1    May 28, 2009

(51) Int. Cl.
*H02J 7/00* (2006.01)
(52) U.S. Cl. ........................................ 320/166
(58) Field of Classification Search .................. 320/166, 320/167
See application file for complete search history.

(56) References Cited

U.S. PATENT DOCUMENTS

| | | | |
|---|---|---|---|
| 5,821,701 A * | 10/1998 | Teggatz et al. ............... | 315/307 |
| 6,326,834 B1 | 12/2001 | Akita et al. | |
| 6,473,318 B1 | 10/2002 | Qian et al. | |
| 6,605,972 B1 | 8/2003 | Wright | |
| 6,775,160 B2 | 8/2004 | Siri | |
| 7,116,137 B2 | 10/2006 | Nautiyal et al. | |
| 7,138,825 B2 | 11/2006 | Kim et al. | |
| 7,327,119 B2 * | 2/2008 | Stephenson, III ............. | 320/103 |
| 7,927,326 B2 * | 4/2011 | Sarkinen et al. ........... | 604/891.1 |
| 2006/0261377 A1 | 11/2006 | Schorpp | |

OTHER PUBLICATIONS

Kim, D. et al., U.S. Appl. No. 11/946,466, Apparatus and Method for Micro Performance Tuning of a Clocked Digital System, filed on Nov. 28, 2007.
Kim, D. et al., U.S. Appl. No. 11/946,522, Apparatus, Method and Program Product for Adaptive Real-Time Power and Performance Optimization of Multi-Core Processors, filed on Nov. 28, 2007.

* cited by examiner

*Primary Examiner* — Richard V Muralidar
(74) *Attorney, Agent, or Firm* — William E. Schiesser; Ronald A. D'Alessandro; Keohane & D'Alessandro PLLC

(57) ABSTRACT

An apparatus and method for recycling and reusing charge in an electronic circuit. The apparatus includes at least one capacitor coupled to a circuit block in the electronic circuit, the capacitor being configured to collect current charge consumed by the circuit block when set to a charge collection mode, and a voltage level comparator configured to detect a fully charged state when the capacitor is fully charged. Further, the apparatus includes a first electrical switch configured to allow, once the fully charged state is detected, the capacitor to switch to a discharge mode for discharging the current charge collected back into the power supply for reuse by the electrical system and a second switch configured to allow, after the capacitor has fully discharged the current charge collected, the capacitor to switch back to the charge collection mode, such that, the current charge is recycled and reused by the electrical system.

24 Claims, 8 Drawing Sheets

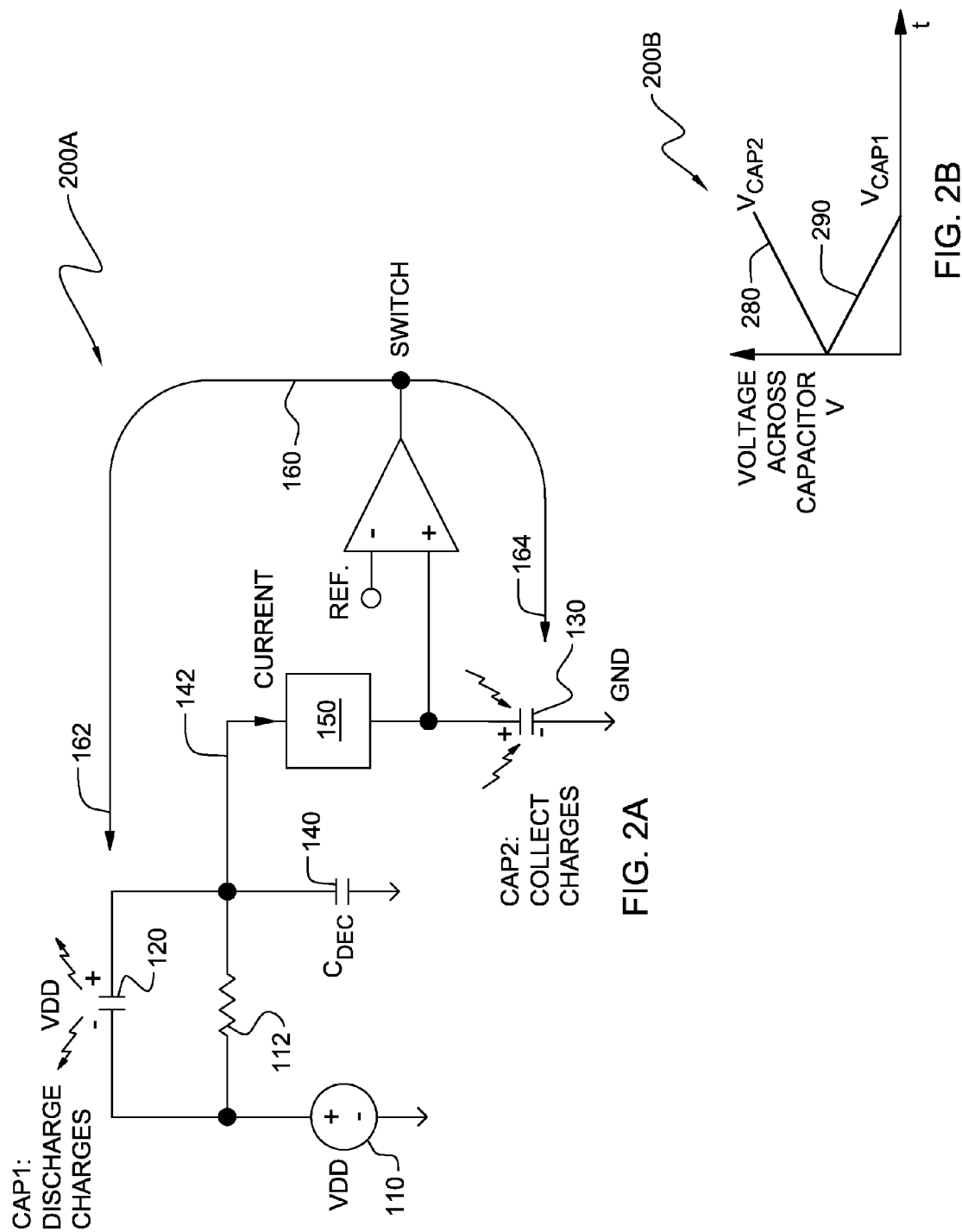

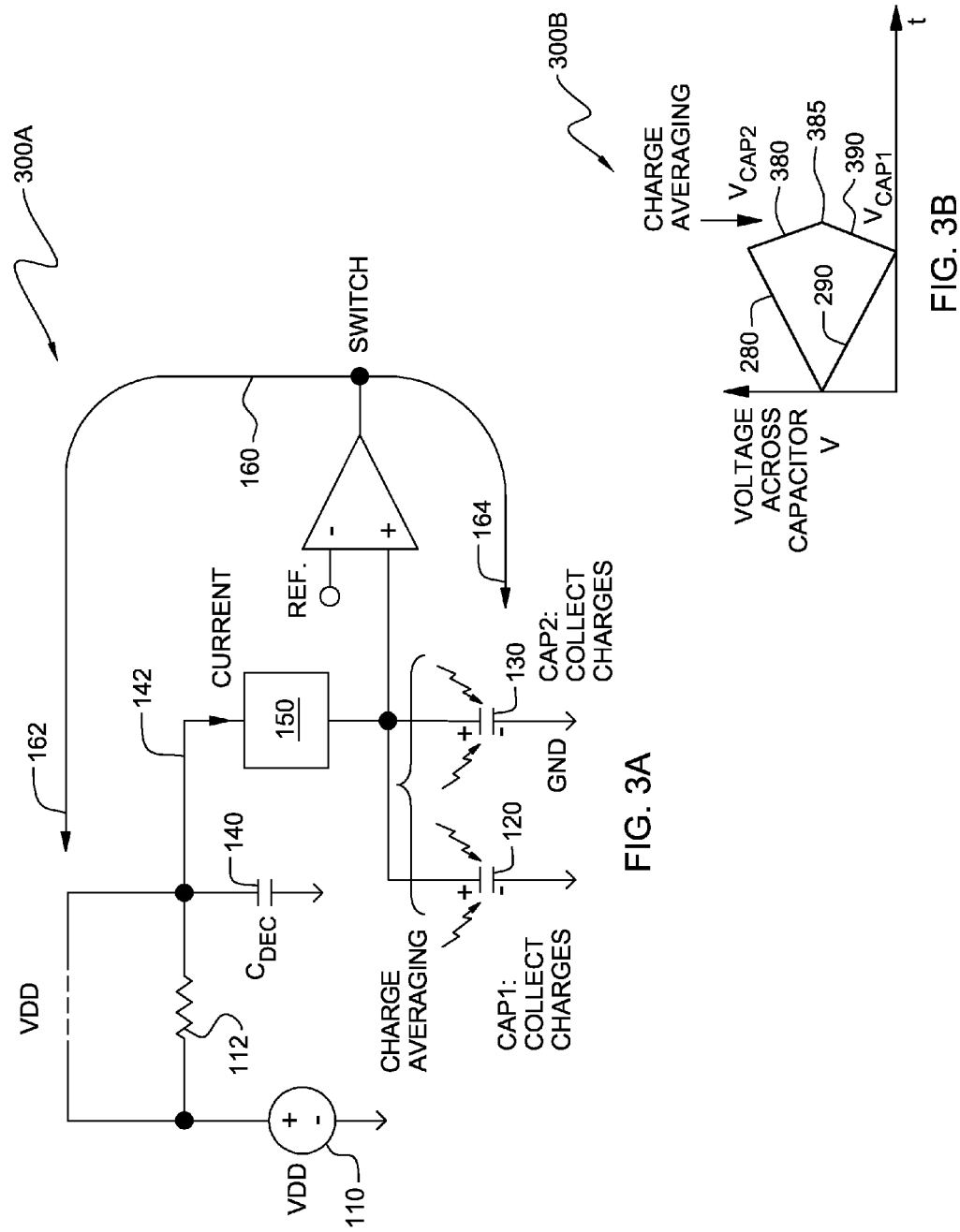

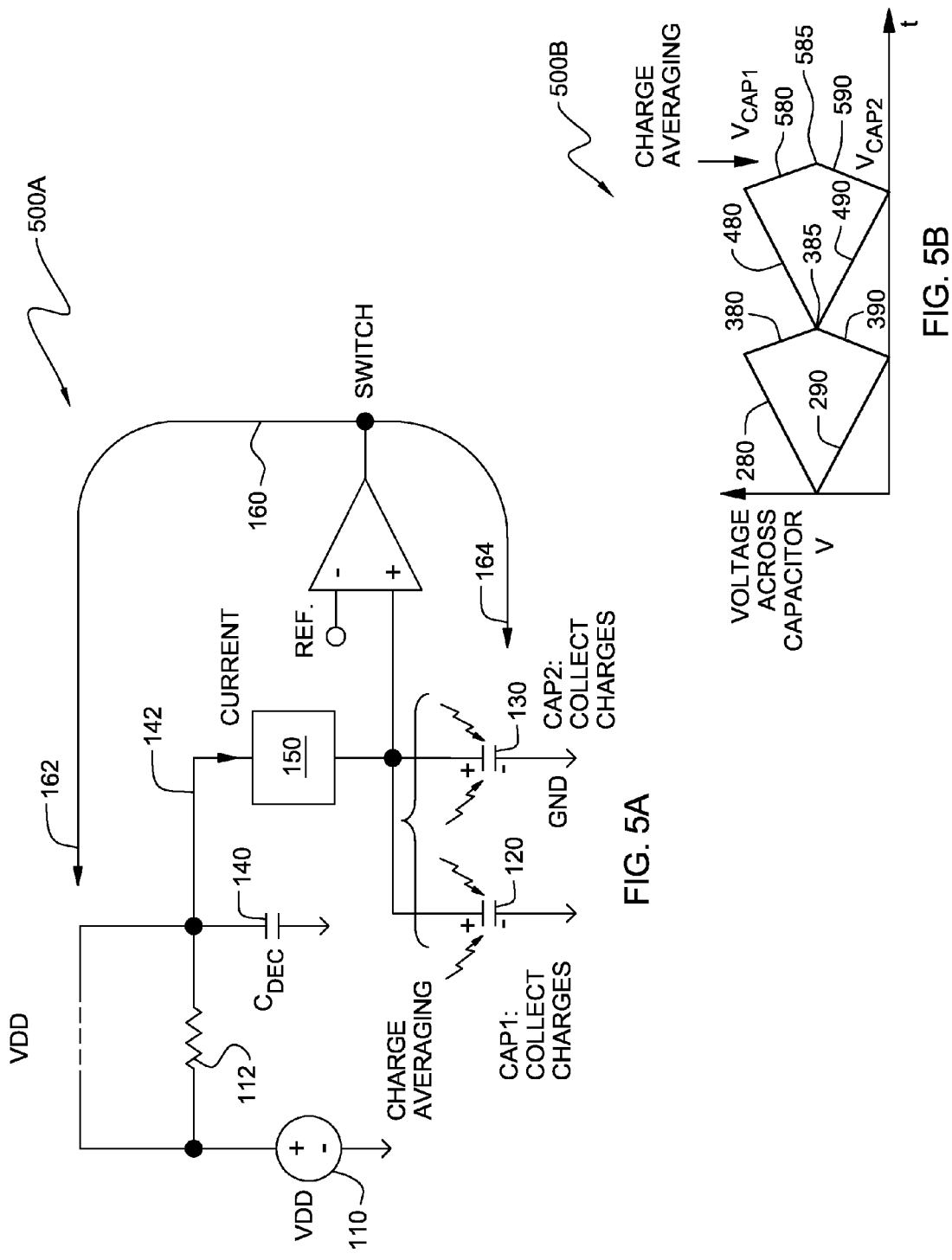

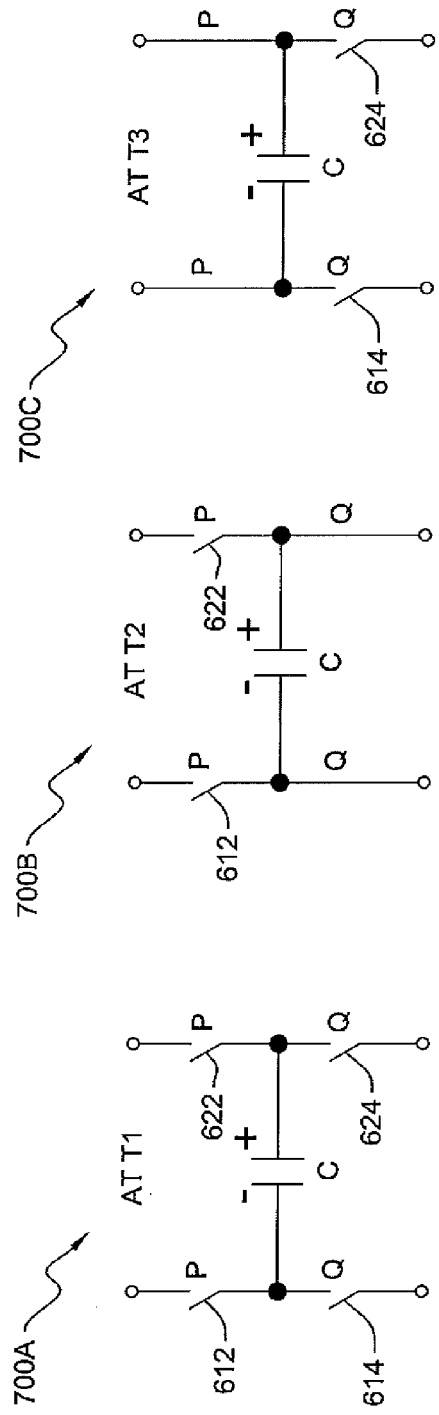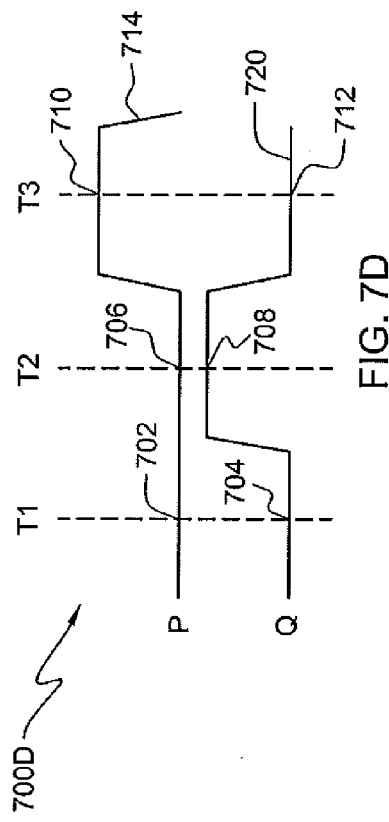
FIG. 7C
FIG. 7B
FIG. 7A
FIG. 7D

APPARATUS AND METHOD FOR RECYCLING AND REUSING CHARGE IN AN ELECTRONIC CIRCUIT

FIELD OF THE INVENTION

The present invention relates to the field of electronic components, and more particularly to an apparatus and method for recycling and reusing charge in an electronic circuit.

BACKGROUND OF THE INVENTION

In an electronic circuit, whether digital or analog, current flow is inevitable for the electronic circuit. Every circuit (whether analog or digital) operates by consuming power. Power consumption becomes a bigger concern as the scale of a device containing the electronic circuit decreases and the quantum physics phenomenon called tunneling occurs, which leads to leakage in current. As such, there is a need for a cost effective and efficient way to improve performance of a circuit and to provide a way to save or optimize power consumption of a circuit.

SUMMARY OF THE INVENTION

In one aspect of the invention, there is provided an apparatus for recycling and reusing charge in an electrical system. The apparatus includes at least one capacitor coupled to a circuit block in an electronic circuit within an electrical system powered by a power supply, the at least one capacitor being configured to collect current charge consumed by the circuit block when set to a charge collection mode, detection means configured to detect a fully charged state in the at least one capacitor when the at least one capacitor is fully charged, first switching means configured to allow, once the fully charged state is detected, the at least one capacitor to switch to a discharge mode for discharging the current charge collected back into the power supply for reuse by the electrical system and second switching means configured to allow, after the at least one capacitor has fully discharged the current charge collected, the at least one capacitor to switch back to the charge collection mode, wherein the current charge is recycled and reused by the electrical system. In an embodiment, the one capacitor is configured to collect the current charge at a local ground of the circuit block, and wherein the at least one capacitor is configured to discharge the current charge into the power supply, and wherein the current charge includes at least one of: leakage current charge and active current charge. In an embodiment, the detection means includes a voltage level comparator configured to detect a circuit ground-level control voltage measured that signifies when the one capacitor is fully charged, and wherein the voltage regulator is further configured to detect a fully discharged state by comparing the circuit ground-level control voltage to an initial voltage measured that signifies when the at least one capacitor is fully charged. In an embodiment, each of the first switching means and the second switching means includes at least two electrical switches, one switch of the two electrical switches being connected to a respective local ground of the circuit for collecting current charge consumed by the electronic circuit and controlled by a first signal and another switch of the two electrical switches being connected to a respective power supply for discharging the current charge collected into the electronic circuit and controlled by a second signal. In an embodiment, the apparatus includes at least two capacitors, each of the at least two capacitors being configured to collect current charge in a respective charge collection mode and being configured to discharge the current charge collected in a respective discharge mode, wherein each capacitor of the at least two capacitors alternate collecting the current charge and discharging the current charges, whereby continuous operation of the electrical system is maintained. In an embodiment, the apparatus reduces power consumption utilized by the electrical system by about 50%.

In another aspect of the invention, there is provided an apparatus for minimizing power consumption by recycling and reusing charge in an electrical system. The apparatus includes a power supply configured to provide supply voltage to an electronic circuit in an electrical system. In an embodiment, the electronic circuit includes a circuit block and at least two switched capacitors coupled to the circuit block, each capacitor of the at least two switched capacitors being configured to collect current charge when set to a charge collection mode and being configured to discharge the current charge collected when set to a charge discharge mode, each capacitor of the at least two switched capacitors being configured to alternate between the charge collection mode and the charge discharge mode, such that, when a first capacitor of the at least two capacitors is set to the charge collection mode, a second capacitor of the at least two capacitors is set to the discharge collection mode, such that, alternating collecting of and discharging of the current charge by the at least two switched capacitors minimizes power consumption of the electrical system and maintains continuous operation of the electronic circuit. In an embodiment, the current charge includes at least one of: leakage current charge and active current charge. In an embodiment, when the first capacitor of the at least two switched capacitors is set to the charge collection mode, the first capacitor is connected at a local ground level of the circuit block for collecting the current charge, and wherein when the second capacitor of the at least two switched capacitors is set to the charge discharge mode, the second capacitor is connected at a supply level of the circuit block for discharging the current charge collected into the power supply for use by the electronic circuit. In an embodiment, a respective capacitor of the two switched capacitors is further configured to establish an initial voltage that signifies when the respective capacitor is fully discharged, such that, the respective capacitor can switch back to the charge collection mode for collecting the current charge consumed by the electronic circuit. In an embodiment, a respective capacitor of the two switched capacitors is further configured to detect a circuit ground-level control voltage that signifies when the respective capacitor is fully charged, such that, the respective capacitor can switch back to the charge discharge mode for discharging the current charge into the electronic circuit.

In an embodiment, the apparatus reduces power consumption in the electrical system by about 50%.

In another aspect of the invention, there is provided a method for recycling and reusing charge within an electronic circuit. The method includes providing at least one switched capacitor coupled to a circuit block of an electronic circuit powered by a power supply, the at least one switched capacitor being configured for switching from a charge collection mode to a charge discharge mode, collecting current charge, using the at least one switched capacitor connected in the charge collection mode to a local ground level of the power supply for collecting the current charge consumed by the electronic circuit, where the current charge includes at least one of: leakage current charge and active current charge. Further, the method includes detecting when the at least one switched capacitor connected at the local ground level has achieved a fully charged state in the charge collection mode, and connecting, in the charge discharge mode, the at least one switched capacitor to a supply level of the power supply for discharging the current charge collected into the circuit block of the electronic circuit, wherein the current charge is recycled within the electronic circuit as a result of alternating configuration of the at least one switched capacitor from the charge collection mode to the charge discharge mode. In an embodiment, the providing step further includes providing at least two switched capacitors coupled to the circuit block of the electronic circuit, each capacitor of the at least two switched capacitors being configured to be switched from the charge collection mode to the charge discharge mode, wherein a first capacitor of the at least two switched capacitors is connected at the local ground level, in the charge collection mode, for collecting the current charge consumed by the circuit block of the electronic circuit, and wherein a second capacitor of the at least two switched capacitors is connected at the supply level, in the discharge mode, for discharging the current charge collected into the circuit block of the electronic circuit. Further, in an embodiment, the providing step further includes switching, when the first capacitor of the at least two switched capacitors is fully charged, connection of the first capacitor from the local ground level to the supply level of the circuit block of the electronic circuit for discharging the current charge collected into the circuit block of the electronic circuit, and switching, when the second capacitor of the at least two switched capacitors is fully discharged, connection of the second capacitor from the supply level to the local ground level of the circuit block to collect the current charge from the circuit block of the electronic circuit, wherein continuous operation of the electronic circuit is maintained. In an embodiment, each capacitor of the at least two switched capacitors is further configured to establish an initial voltage that signifies when a respective capacitor of the at least two switched capacitors is fully discharged, whereby the respective capacitor can switch back to a charge collection mode for collecting the current charge consumed by the electronic circuit. In an embodiment, each capacitor of the at least two switched capacitors is further configured to establish a circuit ground-level control voltage that signifies when a respective capacitor of the at least two switched capacitors is fully charged, whereby the respective capacitor can switch back to a discharge mode for discharging the current charge into the electronic circuit. In an embodiment, the apparatus reduces power consumption by the electronic circuit by about 50%.

In yet another aspect of the invention, there is provided a method for minimizing power consumption by recycling and reusing charge in an electrical system. The method includes providing at least two switched capacitors coupled to an electronic circuit in an electrical system powered by a power supply, each capacitor of the at least two switched capacitors being configured to be switched from a charge collection mode, for collecting current charge consumed by the electronic circuit, to a charge discharge mode for discharging the current charge collected into the electronic circuit, the current charge being charge consumed by the electronic circuit, collecting a respective current charge consumed by the electronic circuit using a first capacitor of the at least two switched capacitors, while simultaneously discharging a respective current charge collected by a second capacitor of the at least two switched capacitors, the first capacitor being connected in the charge collection mode at a local ground level of the electronic circuit, while the second capacitor is connected in the charge discharge mode to a supply level of the electronic circuit for reusing and recycling the current charge discharged into the electronic circuit, and detecting when the first capacitor connected at the local ground level has achieved a fully charged state and disconnecting the first capacitor from the local ground level and reconnecting the first capacitor to the supply level of the electronic circuit for discharging the current charge collected into the electronic circuit and detecting when the second capacitor connected at the supply level has achieved a fully discharged state and disconnecting the second capacitor from the supply level and reconnecting the second capacitor to the local ground level of the electronic circuit for collecting the current charge consumed by the electronic circuit, wherein the current charge is recycled within the electronic circuit as a result of alternating connection of a respective capacitor of the at least two switched capacitors from the charge collection mode to the charge discharge mode. In an embodiment, the current charge includes at least one of: leakage current charge and active current charge. In an embodiment, a respective capacitor of the at least two switched capacitors is configured to detect a circuit ground-level control voltage measured that signifies when the respective capacitor is fully charged, and wherein the respective capacitor is further configured to detect a fully discharged state by comparing the circuit ground-level control voltage to an initial voltage measured that signifies when the respective capacitor is fully charged. In an embodiment, a respective capacitor of the at least two switched capacitors is connected to at least two electrical ports, and wherein one electrical port of the at least two electrical ports is connected to a respective supply level of the electronic circuit and a second electrical port of the at least two electrical ports is connected to a respective local ground level of the electronic circuit. In an embodiment, the detecting step further includes detecting, using a voltage level comparator, when the first capacitor connected at the local ground level has achieved a fully charged state and when the second capacitor connected at the supply level has achieved a fully discharged state. In an embodiment, use of at least two switched capacitors maintains continuous operation of the electronic circuit and where power consumption of the electrical system is reduced by about 50%.

BRIEF DESCRIPTION OF THE DRAWINGS

The accompanying drawings, which are incorporated in and form a part of this specification, illustrate embodiments of the invention and, together with the description, serve to explain the principles of the invention:

FIG. 2A is a schematic block diagram of an electronic circuit using two switched capacitors, with a first capacitor being electrically connected at a power supply level for collecting charge and a second capacitor being electrically connected at a ground level for discharging current charge, in accordance with an embodiment of the invention.

FIG. 2B graphically illustrates the charging and discharging of the two switched capacitors of the electronic circuit shown in FIG. 2A, in accordance with an embodiment of the invention.

FIG. 3A is a schematic block diagram of the electronic circuit, where both the first capacitor and the second capacitor are electrically connected to a ground level of the electronic circuit, in accordance with an embodiment of the invention.

FIG. 3B graphically illustrates the charging and discharging of the two switched capacitors of the electronic circuit shown in FIG. 3A, in accordance with an embodiment of the invention.

FIG. 5A is a schematic block diagram of an electronic circuit using two switched capacitors where both the first capacitor and the second capacitor are electrically connected to a ground level of the electronic circuit, in accordance with an embodiment of the invention.

FIG. 5B graphically illustrates the charging and discharging of the two switched capacitors of the electronic circuit shown in FIG. 5A, in accordance with an embodiment of the invention.

FIGS. 7A-7C are schematic block diagrams of a switched capacitor used in an electronic circuit to collect and discharge current charge in response to a control signal, in accordance with an embodiment of the invention.

FIG. 7D is a graphical illustration of two control signals used to control the four switches shown in the capacitors of FIGS. 7A-7C, in accordance with an embodiment of the invention.

DETAILED DESCRIPTION OF THE INVENTION

Figure 1:
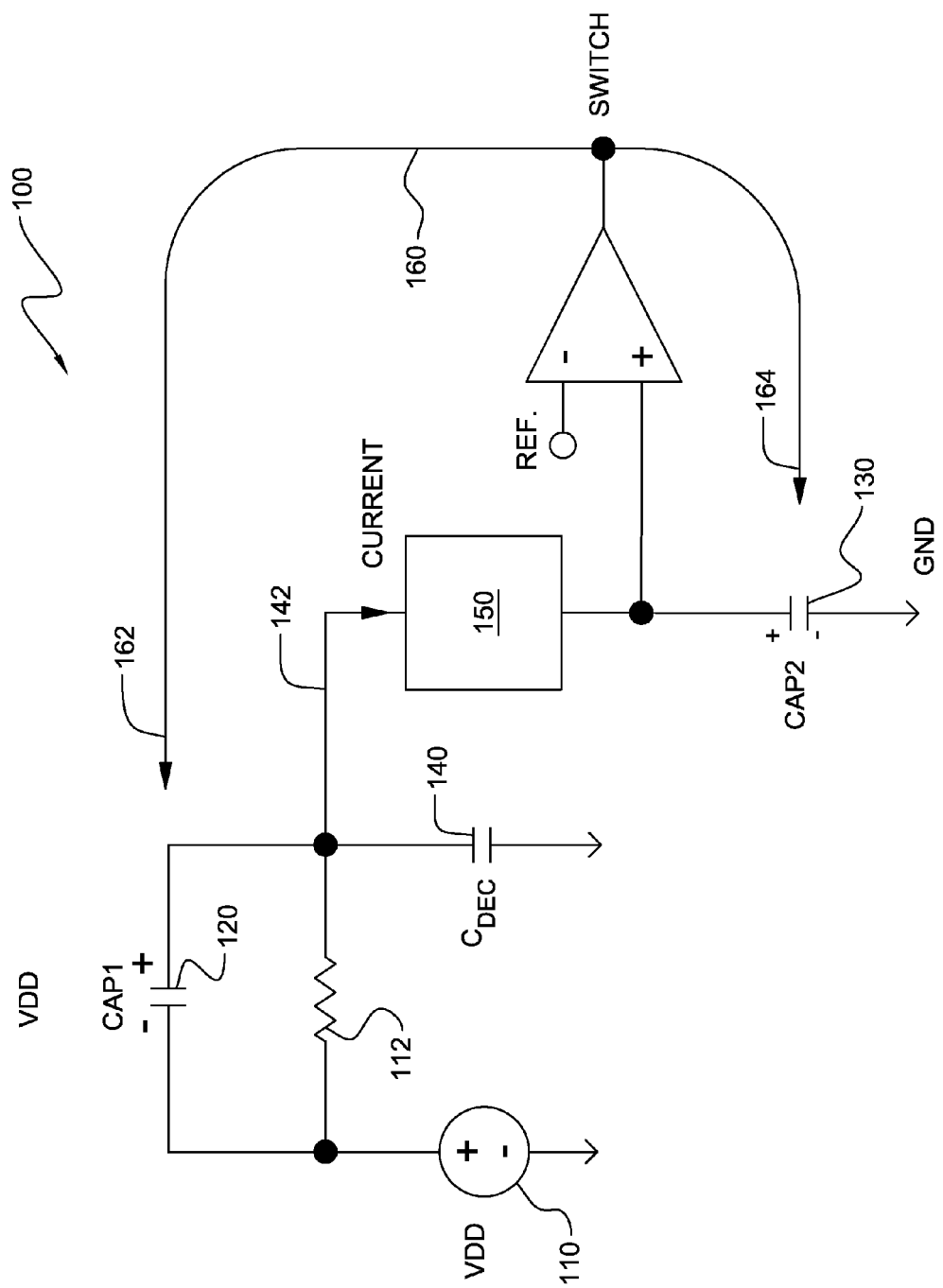
FIG. 1 is a schematic block diagram of an electronic circuit for recycling and reusing charge in an electronic circuit, in accordance with an embodiment of the invention.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents. Reference will now be made in detail to the preferred embodiments of the invention.

In one embodiment, the present invention provides an apparatus for recycling and reusing charge in an electrical system. The apparatus comprises at least one capacitor coupled to a circuit block in an electronic circuit within an electrical system powered by a power supply, the at least one capacitor being configured to collect current charge consumed by the circuit block when set to a charge collection mode, detection means configured to detect a fully charged state in the at least one capacitor when the at least one capacitor is fully charged, first switching means configured to allow, once the fully charged state is detected, the at least one capacitor to switch to a discharge mode for discharging the current charge collected back into the power supply for reuse by the electrical system and second switching means configured to allow, after the at least one capacitor has fully discharged the current charge collected, the at least one capacitor to switch back to the charge collection mode, wherein the current charge is recycled and reused by the electrical system. In an embodiment, the one capacitor is configured to collect the current charge at a local ground of the circuit block, and wherein the at least one capacitor is configured to discharge the current charge into the power supply, and wherein the current charge comprises at least one of: leakage current charge and active current charge. In an embodiment, the detection means comprises a voltage level comparator configured to detect a circuit ground-level control voltage measured that signifies when the one capacitor is fully charged, and wherein the voltage regulator is further configured to detect a fully discharged state by comparing the circuit ground-level control voltage to an initial voltage measured that signifies when the at least one capacitor is fully charged. In an embodiment, each of the first switching means and the second switching means comprises at least two electrical switches, one switch of the two electrical switches being connected to a respective local ground of the circuit for collecting current charge consumed by the electronic circuit and controlled by a first signal and another switch of the two electrical switches being connected to a respective power supply for discharging the current charge collected into the electronic circuit and controlled by a second signal. In an embodiment, the apparatus comprises at least two capacitors, each of the at least two capacitors being configured to collect current charge in a respective charge collection mode and being configured to discharge the current charge collected in a respective discharge mode, wherein each capacitor of the at least two capacitors alternate collecting the current charge and discharging the current charges, whereby continuous operation of the electrical system is maintained. In an embodiment, the apparatus reduces power consumption utilized by the electrical system by about 50%.

In another embodiment, the present invention provides an apparatus for minimizing power consumption by recycling and reusing charge in an electrical system. The apparatus comprises a power supply configured to provide supply voltage to an electronic circuit in an electrical system. In an embodiment, the electronic circuit comprises a circuit block and at least two switched capacitors coupled to the circuit block, each capacitor of the at least two switched capacitors being configured to collect current charge when set to a charge collection mode and being configured to discharge the current charge collected when set to a charge discharge mode, each capacitor of the at least two switched capacitors being configured to alternate between the charge collection mode and the charge discharge mode, such that, when a first capacitor of the at least two capacitors is set to the charge collection mode, a second capacitor of the at least two capacitors is set to the discharge collection mode, such that, alternating collecting of and discharging of the current charge by the at least two switched capacitors minimizes power consumption of the electrical system and maintains continuous operation of the electronic circuit. In an embodiment, the current charge comprises at least one of: leakage current charge and active current charge. In an embodiment, when the first capacitor of the at least two switched capacitors is set to the charge collection mode, the first capacitor is connected at a local ground level of the circuit block for collecting the current charge, and wherein when the second capacitor of the at least two switched capacitors is set to the charge discharge mode, the second capacitor is connected at a supply level of the circuit block for discharging the current charge collected into the power supply for use by the electronic circuit. In an embodiment, a respective capacitor of the two switched capacitors is further configured to establish an initial voltage that signifies when the respective capacitor is fully discharged, such that, the respective capacitor can switch back to the charge collection mode for collecting the current charge consumed by the electronic circuit. In an embodiment, a respective capacitor of the two switched capacitors is further configured to detect a circuit ground-level control voltage that signifies when the respective capacitor is fully charged, such that, the respective capacitor can switch back to the charge discharge mode for discharging the current charge into the electronic circuit. In an embodiment, the apparatus reduces power consumption in the electrical system by about 50%.

Reference is now made to FIGS. 1, 2A-2B, 3A-3B, 4A-4B and 5A-5B, which depict various embodiments of an electronic circuit in an electrical system for recycling and reusing charge in order to minimize power consumption. Turning to FIG. 1, reference numeral 100 depicts an embodiment of an electronic circuit that comprises of a circuit block 150 that is powered by a power supply voltage VDD (reference numeral 110) and further comprises electrical components, such as, a resistor 112, a decoupling capacitor ($C_{DEC}$), reference numeral 140, a first capacitor 120 (CAP1), and a second capacitor 130 (CAP2). In an embodiment, the decoupling capacitor 140 comprises a local battery coupled to the electronic circuit that minimizes voltage bouncing. It will be apparent to one skilled in the art, that the electronic circuit 100 may comprise other electrical components not shown herein. In an embodiment, as shown in FIG. 1, the electronic circuit 100 further comprises a switching sub-circuit (labeled as reference numeral 160), that is electrically coupled to the electronic circuit 100 at a supply level and at a local ground level of the electronic circuit. In particular, the switching sub-circuit 160 is switchable, such that, the switching sub-circuit is electrically connected to the first capacitor 120 (CAP1) at a power supply level (VDD) at the top of the electronic circuit of FIG. 1 (referenced by reference numeral 162) at a point-in-time, whereas, the switching sub-circuit 160 is switchable, such that, the switching sub-circuit is electrically connected to the second capacitor 130 (CAP2) at a local ground level (GND) at the bottom of the electronic circuit of FIG. 1 (referenced by reference numeral 164) at the same point-in-time. In an embodiment and as described herein, the electronic circuit comprises an integrated circuit, such as, an integrated circuit that contains digital logic block 150 used in chips or microprocessors and other digital logic circuits. Although, the invention is described herein with respect to an integrated circuit, the invention is applicable to any type of electrical and electronic circuit, such as, an electronic circuit that comprises an analog circuit block 150 and uses a switching sub-circuit 160, as described herein for recycling and reusing charge within the electronic circuit. Further, in an embodiment, the first capacitor 120 (CAP1) and the second capacitor 130 (CAP2) comprises a switched capacitor that is configurable or switched by the switching sub-circuit 160. In an embodiment, each of the switched capacitors 120 and 130 is comprised of four switches, described further herein below with respect to FIGS. 6 and 7A-7D. In particular, the capacitor or switched capacitor is switched from the bottom (ground level) of the electronic circuit (where charges are collected) to the top (supply level) of the electronic circuit (where charges are poured or discharged back into the circuit). If there is only one capacitor that is electrically connected at the supply level (top) of the circuit, the circuit block 150 is not operational because there is no ground path that can consume the current and charges. However, given that there are two capacitors (120 and 130) electrically connected to the electronic circuit, one capacitor can be switched by a switching sub-circuit from a charge mode (where the one capacitor is electrically connected to a local ground level of the electronic circuit) to a discharge mode (where the one capacitor is electrically connected to a supply level of the electronic circuit), while another capacitor can be switched by the switching sub-circuit from a discharge mode (where the latter capacitor is electrically connected to the supply level of the electronic circuit) to a charge mode (where the latter capacitor is electrically connected to the supply level of the electronic circuit), as such, a ground path is provided to the electronic circuit at all times, thus, maintaining continuous operation of the circuit block 150, as described herein below. Although FIGS. 1, 2A, 3A, 4A and 5A show an electronic circuit comprising of two capacitors, it is understood that multiple capacitors may be used to simultaneously collect and discharge the charges consumed by the electronic circuit in an alternating manner, as described further herein below.

Reference is now made to FIGS. 2A-2B, 3A-3B, 4A-4B and 5A-5B, which illustrate various aspects of the invention. For ease of explanation, the electrical components shown in the electronic circuit of FIG. 1 have been numbered the same throughout FIGS. 2A-2B, 3A-3B, 4A-4B and 5A-5B. Turning to FIG. 2A, reference numeral 200A shows an embodiment of an electronic circuit for recycling and reusing charge, whereas, FIG. 2B graphically illustrates the charging and discharging of charge using two capacitors, as explained further herein below. As shown in FIG. 2A, the electronic circuit comprises of a circuit block 150, for example, a digital logic block in an integrated circuit, that is powered by a local power supply voltage VDD (reference numeral 110). The electronic circuit 200A further comprises components, such as, a resistor 112, a decoupling capacitor ($C_{DEC}$), reference numeral 140, a first capacitor 120 (CAP1), and a second capacitor 130 (CAP2). In an embodiment, as shown in FIG. 2A, the electronic circuit 200A further comprises a switching sub-circuit (labeled as reference numeral 160), that is electrically coupled to the electronic circuit 200A at a supply level and at a local ground level of the electronic circuit. In particular, the switching sub-circuit 160 is connected to the first capacitor 120 (CAP 1) at the power supply level (VDD) at the top of the electronic circuit of FIG. 2A (referenced by reference numeral 162), whereas, the switching sub-circuit 160 is connected to the second capacitor 130 (CAP2) at the ground level (GND) at the bottom of the electronic circuit of FIG. 2A (referenced by reference numeral 164). In an embodiment, when the switching sub-circuit 160 is turned on, a capacitor connected at a local ground (GND), in this example, the second capacitor 130 (CAP2) is configured or switched (by the switching sub-circuit 160) to a charge mode in order to collect current charge (indicated by arrow 142) consumed by the circuit block 150, whereas, another capacitor connected at the power supply (VDD), in this example, the first capacitor 120 (CAP1) is configured or switched (by the switching sub-circuit 160) to a discharge mode in order to discharge or dump any charge that was collected when the first capacitor was set to a charge mode. In an embodiment, the current charge collected comprises either leakage current charge and/or active current charge. Accordingly, reference numeral 200B in FIG. 2B shows the voltage V across a capacitor (shown on the vertical axis) over a period of time t (shown on the horizontal axis). As shown, the voltage ($V_{CAP1}$) across the first capacitor is shown by the descending line 290, whereas, the voltage ($V_{CAP2}$) across the second capacitor is shown by the ascending line 280. In particular, as shown in FIG. 2A, the second capacitor 130 (CAP2) that is connected to a local ground is collecting charge used by the electronic circuit, which is shown by the rising voltage ($V_{CAP2}$, line 280) in FIG. 2B, whereas, the first capacitor 120 (CAP1) that is connected to a power supply is simultaneously discharging or dumping charge into the power supply for reuse of the charge by the electronic circuit, which is shown by the dropping voltage ($V_{CAP1}$, line 290) in FIG. 2B.

Turning to FIG. 3A, reference numeral 300A shows a continuation of the recycling and reusing of charge consumed by the electronic circuit shown in FIG. 2A. In particular, the first capacitor 120 (CAP1), which was shown in FIG. 2A as being electrically connected at the power supply level (VDD) at the top of the electronic circuit, is now electrically disconnected by the switching sub-circuit 160 at the power supply level VDD and instead is now shown in FIG. 3A as being electrically connected or switched to the local ground level (GND) at the bottom of the electronic circuit 300A for collecting charge. Further, the second capacitor 130 (CAP2) is still electrically connected to the local ground level (GND). As such, when the first capacitor 120 (CAP1) collects charges, the voltage ($V_{CAP1}$) across the first capacitor 120 rises, whereas, the voltage ($V_{CAP2}$) across the second capacitor 130 drops. Accordingly, reference numeral 300B in FIG. 3B shows the voltage V across a capacitor (shown on the vertical axis) over a period of time t (shown on the horizontal axis). In particular, FIG. 3B shows that after the first capacitor 120 (CAP1) has completed discharging all the charge collected (as shown by line 290), the first capacitor 120 (CAP1) is connected at the local ground level of the electronic circuit and begins collecting charge and, thus, the voltage $V_{CAP1}$ of the first capacitor 120 (CAP1) is shown as rising (line 390). Further, FIG. 3B shows that when the second capacitor 130 (CAP2) is still connected to the local ground level of the electronic circuit and, as such, the second capacitor 130 (CAP2) begins to slow down collection of charge compared to the first capacitor 120 (CAP1), thus, the voltage $V_{CAP2}$ of the second capacitor 130 (CAP2) is shown as falling (line 380). The first capacitor 120 (CAP1) continues collecting charge, whereas, the second capacitor 130 (CAP2) also continues collecting charge but at a slower pace, until an equilibrium point or a charge averaging point is reached (indicated by reference numeral 385), where the voltage across both the first and second capacitors is the same.

Figure 4A:
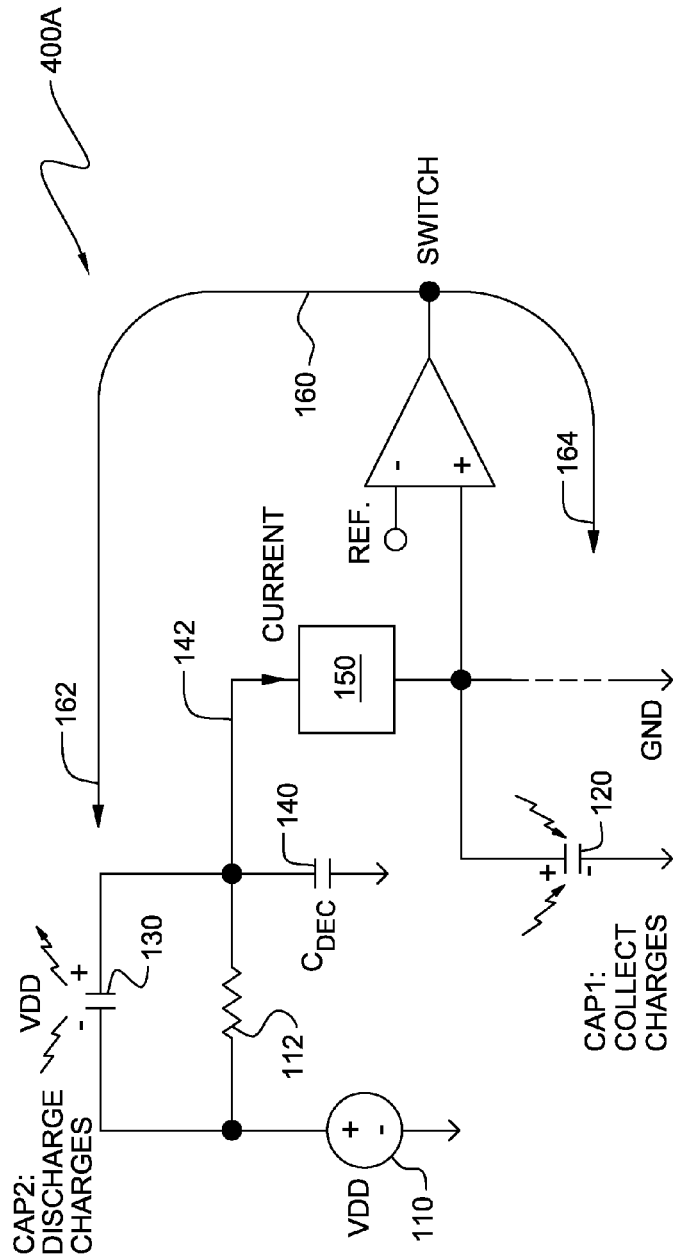
FIG. 4A is a schematic block diagram of an electronic circuit using two switched capacitors with the second capacitor being electrically connected at a power supply level for discharging charge and the first capacitor being electrically connected at a ground level for collecting current charge, in accordance with an embodiment of the invention.
Figure 4B:
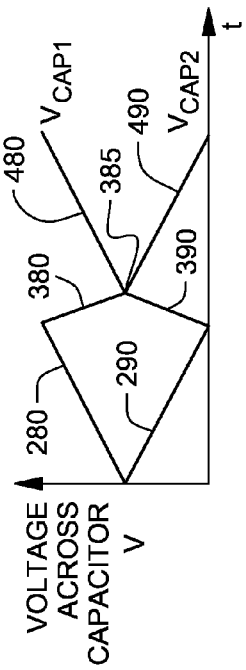
FIG. 4B graphically illustrates the charging and discharging of the two switched capacitors of the electronic circuit shown in FIG. 4A, in accordance with an embodiment of the invention.

Similarly, turning to FIG. 4A, reference numeral 400A shows a continuation of the recycling and reusing of charge process in the electronic circuit shown in FIG. 3A. In particular, once the charge in the first capacitor 120 and the second capacitor 130 averages (at point 385, also shown in FIG. 4B), the second capacitor 130 (CAP2), which was shown in FIG. 3A as being electrically connected at the local ground level (GND) at the bottom of the electronic circuit, is now electrically disconnected at the local ground level GND and instead the second capacitor 130 (CAP2) is now shown in FIG. 4A as being electrically connected or switched to the power supply (VDD) at the top of the electronic circuit 400A. Further, the first capacitor 120 (CAP1) is still electrically connected to the local ground level (GND) at the bottom of the electronic circuit. Again, in FIG. 4B, reference numeral 400B shows voltage V across a respective capacitor on the vertical axis and the time t on the horizontal axis. Accordingly, the first capacitor 120 (CAP1) electrically connected to a local ground of the electronic circuit continues to collect charges, such that, the voltage ($V_{CAP1}$) across the first capacitor 120 rises from the equilibrium point 385, as shown by ascending line 480 in FIG. 4B. Further, the second capacitor 130 (CAP2) now electrically switched to the power supply discharges the charge into the electronic circuit, such that, the voltage ($V_{CAP2}$) across the second capacitor 130 drops from the equilibrium point 385, as shown by descending line 490 in FIG. 4B.

Further, turning to FIG. 5A, reference numeral 500A shows a continuation of the process of recycling and reusing of charge in the electronic circuit shown in FIG. 4A. In particular, the second capacitor 130 (CAP2), which was shown in FIG. 4A as being electrically connected at the power supply level (VDD) at the top of the electronic circuit, is now electrically disconnected at the power supply level VDD and instead is now shown in FIG. 5A as being electrically connected or switched to the local ground level (GND) at the bottom of the electronic circuit 500A. Further, the first capacitor 120 (CAP1) is still electrically connected to the local ground level (GND). As such, when the second capacitor 130 (CAP2) collects charges, the voltage ($V_{CAP2}$) across the second capacitor 130 rises, whereas, the voltage ($V_{CAP1}$) across the first capacitor 120 which is still collecting charge, but a slower pace, drops. Accordingly, reference numeral 500B in FIG. 5B shows the voltage V across a capacitor (shown on the vertical axis) over a period of time t (shown on the horizontal axis). In particular, FIG. 5B shows that after the second capacitor 130 (CAP2) is fully charged (as shown by line 480), the second capacitor 130 (CAP2) is connected at the local ground level of the electronic circuit and begins collecting charge and, thus, the voltage $V_{CAP2}$ across the second capacitor 130 (CAP2) is shown as increasing (line 590). Further, FIG. 3B shows that when the second capacitor 130 (CAP2) is switched to collecting charge at the local ground level of the electronic circuit, the first capacitor 120 (CAP1), which is still connected to the local ground level of the electronic circuit, collects charge but at a slower pace than the second capacitor 130 (CAP2), thus, the voltage $V_{CAP1}$ across the first capacitor 120 (CAP1) is shown as falling (line 580). The second capacitor 130 (CAP2) continues collecting charge, whereas, the first capacitor 120 (CAP1) also continues collecting charge, but at a slower pace, until an equilibrium point or a charge averaging point is reached (indicated by reference numeral 585), where the voltage across both the first and second capacitors is the same. In this manner, the process shown in FIGS. 300A, 400A and 500A is repeated, such that, the switching sub-circuit 160 electrically switches (as discussed further herein below with respect to FIGS. 6, 7A-7D) one capacitor in the electronic circuit to a collection mode for collecting charge at a local ground of the electronic circuit, whereas, the switching sub-circuit 160 electrically switches the other capacitor in the electronic circuit to a discharge mode for discharging the charge collected into the power supply for the electronic circuit, whereby continuous operation of the electronic circuit is maintained. Further, alternating switching of the capacitors reduces the power supply current and the power consumption of the electronic circuit by about 50%.

Figure 6:
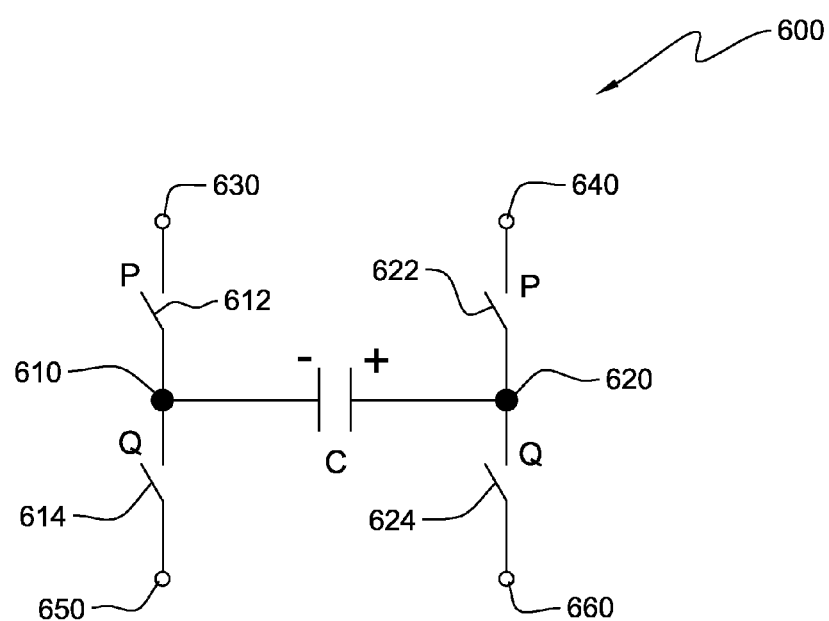
FIG. 6 is a schematic block diagram of a switched capacitor used in an electronic circuit to collect and discharge current charge, in accordance with an embodiment of the invention.

Turning to FIG. 6, reference numeral 600 depicts a capacitor (also referred to herein as a switched capacitor, that is, a capacitor that is switched back and forth by the switching sub-circuit, as discussed herein above with respect to FIGS. 1, 2A-5A. In an embodiment, as shown in FIG. 6, capacitor 600 (C) has four electrical ports 630, 640, 650 and 660, each of which can be electrically connected either to the power supply or to the ground. Further, the capacitor 600 has two nodes 610 and 620, where node 610 is connected to two electrical switches (also referred to simply as switches) 612 and 614 and where node 620 is connected to two electrical switches 622 and 624. In an embodiment, there are respective control signals P and Q that connect the capacitor 600 alternatively to the power supply and to the ground of the electronic circuit. In an embodiment, as shown in FIG. 6, switches 612 and 622 are controlled by signal P, whereas, switches 614 and 624 are controlled by signal Q. For instance, if ports 630 and 640 are designated for electrical connection to the power supply of the electronic circuit and if ports 650 and 660 are designated for electrical connection to the ground level of the electronic circuit, then switches 612 and 622 can be used for the supply side ports 630 and 640 for discharging charge collected by the capacitor and switches 614 and 624 can be used at the ground level for charging or collecting charge.

Reference is now made to FIGS. 7A-7D, which illustrate how a switched capacitor C is controlled by control signals P and Q for charging and discharging charge in an electronic circuit. Turning to FIG. 7A, reference numeral 700A shows a capacitor C that has four switches 612, 622, 614 and 624 at time T1. In an embodiment, the two switches 612 and 622 are controlled (that is, activated and deactivated simultaneously) by signal P, whereas, switches 614 and 624 are controlled (that is, activated and deactivated simultaneously) by signal Q. Further, reference numeral 700D in FIG. 7D, graphically illustrates the turning on and turning off of control signals P and Q. At time T1, as shown in FIG. 7A, both control signals P and Q are turned off, as a result, in reference numeral 700A of FIG. 7A, switches 612 and 622 are open, that is, not electrically connected (since control signal P at reference numeral 702 is turned off) and switches 614 and 624 are also open that is, not electrically connected (since control signal Q at reference numeral 704 is turned off). Further, at time T2 in FIG. 7D, control signal P is still turned off (represented by reference numeral 706), whereas, control signal Q is turned on (represented by reference numeral 708), as a result, in reference numeral 700B of FIG. 7B, switches 612 and 622 are still open, that is, not electrically connected (since control signal P is turned off), whereas, switches 614 and 624 (shown in FIG. 7A) are now closed, that is, electrically connected (since control signal Q is turned on). Further yet, at time T3 in FIG. 7D, control signal P is now turned on (represented by reference numeral 710), whereas, control signal Q is turned off (represented by reference numeral 712), as a result, in reference numeral 700C of FIG. 7C, switches 612 and 622 (shown in FIG. 7A) are now closed, that is, electrically connected (since control signal P is turned on), whereas, switches 614 and 624 are open, that is, electrically disconnected (since control signal Q is turned off).

In yet another embodiment, the invention provides a method for recycling and reusing charge in an electrical system. In particular, the invention provides a vertical charge recycling method, where the transfer of charge is vertical in terms of the electrical potential voltage, that is, the charge is being moved from the lower parts of the circuit (circuit ground) to the upper parts of the circuit (versus a horizontal charge recycling method, where charge is recycled from one output to another output of a circuit). The method comprises providing at least one switched capacitor coupled to a circuit block of an electronic circuit powered by a power supply, the at least one switched capacitor being configured for switching from a charge collection mode to a charge discharge mode, collecting current charge, using the at least one switched capacitor connected in the charge collection mode to a local ground level of the power supply for collecting the current charge consumed by the electronic circuit, where the current charge comprises at least one of: leakage current charge and active current charge. Further, the method comprises detecting when the at least one switched capacitor connected at the local ground level has achieved a fully charged state in the charge collection mode, and connecting, in the charge discharge mode, the at least one switched capacitor to a supply level of the power supply for discharging the current charge collected into the circuit block of the electronic circuit, wherein the current charge is recycled within the electronic circuit as a result of alternating configuration of the at least one switched capacitor from the charge collection mode to the charge discharge mode. In an embodiment, the providing step further comprises providing at least two switched capacitors coupled to the circuit block of the electronic circuit, each capacitor of the at least two switched capacitors being configured to be switched from the charge collection mode to the charge discharge mode, wherein a first capacitor of the at least two switched capacitors is connected at the local ground level, in the charge collection mode, for collecting the current charge consumed by the circuit block of the electronic circuit, and wherein a second capacitor of the at least two switched capacitors is connected at the supply level, in the discharge mode, for discharging the current charge collected into the circuit block of the electronic circuit. Further, in an embodiment, the providing step further comprises switching, when the first capacitor of the at least two switched capacitors is fully charged, connection of the first capacitor from the local ground level to the supply level of the circuit block of the electronic circuit for discharging the current charge collected into the circuit block of the electronic circuit, and switching, when the second capacitor of the at least two switched capacitors is fully discharged, connection of the second capacitor from the supply level to the local ground level of the circuit block to collect the current charge from the circuit block of the electronic circuit, wherein continuous operation of the electronic circuit is maintained. In an embodiment, each capacitor of the at least two switched capacitors is further configured to establish an initial voltage that signifies when a respective capacitor of the at least two switched capacitors is fully discharged, whereby the respective capacitor can switch back to a charge collection mode for collecting the current charge consumed by the electronic circuit. In an embodiment, each capacitor of the at least two switched capacitors is further configured to establish a circuit ground-level control voltage that signifies when a respective capacitor of the at least two switched capacitors is fully charged, whereby the respective capacitor can switch back to a discharge mode for discharging the current charge into the electronic circuit. In an embodiment, the apparatus reduces power consumption by the electronic circuit by about 50%.

Further, in yet another embodiment of the invention, there is provided a method for minimizing power consumption by recycling and reusing charge in an electrical system. The method comprises providing at least two switched capacitors coupled to an electronic circuit in an electrical system powered by a power supply, each capacitor of the at least two switched capacitors being configured to be switched from a charge collection mode, for collecting current charge consumed by the electronic circuit, to a charge discharge mode for discharging the current charge collected into the electronic circuit, the current charge being charge consumed by the electronic circuit, collecting a respective current charge consumed by the electronic circuit using a first capacitor of the at least two switched capacitors, while simultaneously discharging a respective current charge collected by a second capacitor of the at least two switched capacitors, the first capacitor being connected in the charge collection mode at a local ground level of the electronic circuit, while the second capacitor is connected in the charge discharge mode to a supply level of the electronic circuit for reusing and recycling the current charge discharged into the electronic circuit, and detecting when the first capacitor connected at the local ground level has achieved a fully charged state and disconnecting the first capacitor from the local ground level and reconnecting the first capacitor to the supply level of the electronic circuit for discharging the current charge collected into the electronic circuit and detecting when the second capacitor connected at the supply level has achieved a fully discharged state and disconnecting the second capacitor from the supply level and reconnecting the second capacitor to the local ground level of the electronic circuit for collecting the current charge consumed by the electronic circuit, wherein the current charge is recycled within the electronic circuit as a result of alternating connection of a respective capacitor of the at least two switched capacitors from the charge collection mode to the charge discharge mode. In an embodiment, the current charge comprises at least one of: leakage current charge and active current charge. In an embodiment, a respective capacitor of the at least two switched capacitors is configured to detect a circuit ground-level control voltage measured that signifies when the respective capacitor is fully charged, and wherein the respective capacitor is further configured to detect a fully discharged state by comparing the circuit ground-level control voltage to an initial voltage measured that signifies when the respective capacitor is fully charged. In an embodiment, a respective capacitor of the at least two switched capacitors is connected to at least two electrical ports, and wherein one electrical port of the at least two electrical ports is connected to a respective supply level of the electronic circuit and a second electrical port of the at least two electrical ports is connected to a respective local ground level of the electronic circuit. In an embodiment, the detecting step further comprises detecting, using a voltage level comparator, when the first capacitor connected at the local ground level has achieved a fully charged state and when the second capacitor connected at the supply level has achieved a fully discharged state. In an embodiment, use of at least two switched capacitors maintains continuous operation of the electronic circuit and where power consumption of the electrical system is reduced by about 50%.

Figure 8A:
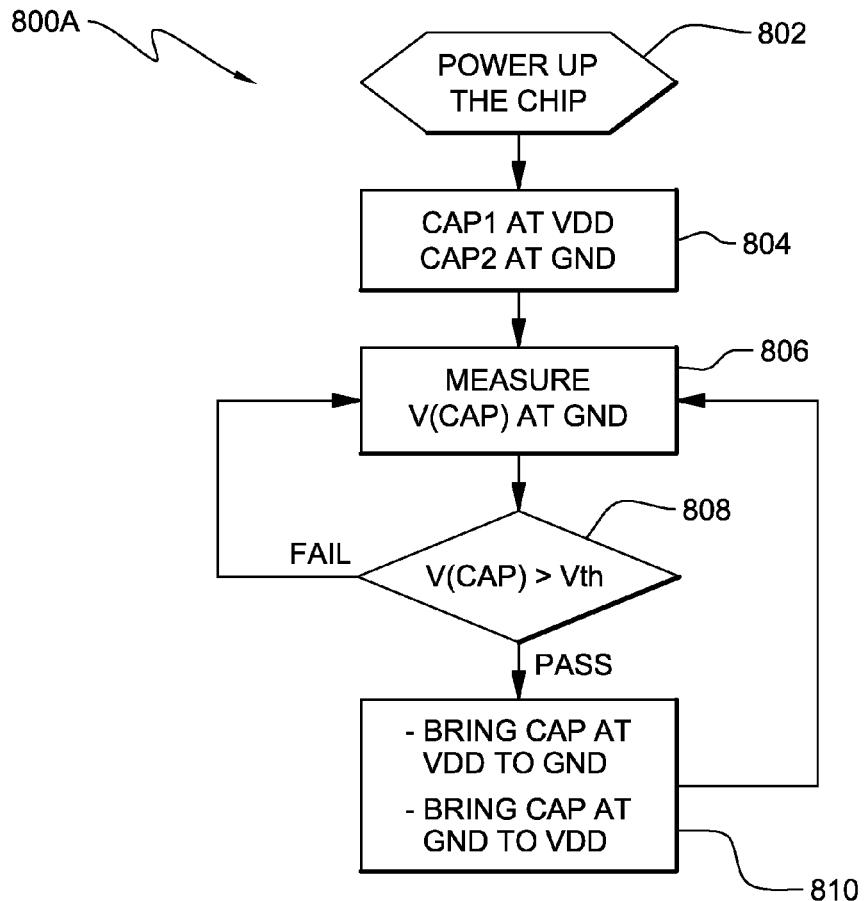
FIG. 8A is a flowchart illustrating a method for collecting and discharging current charge in an electronic circuit, in accordance with an embodiment of the invention.
Figure 8B:
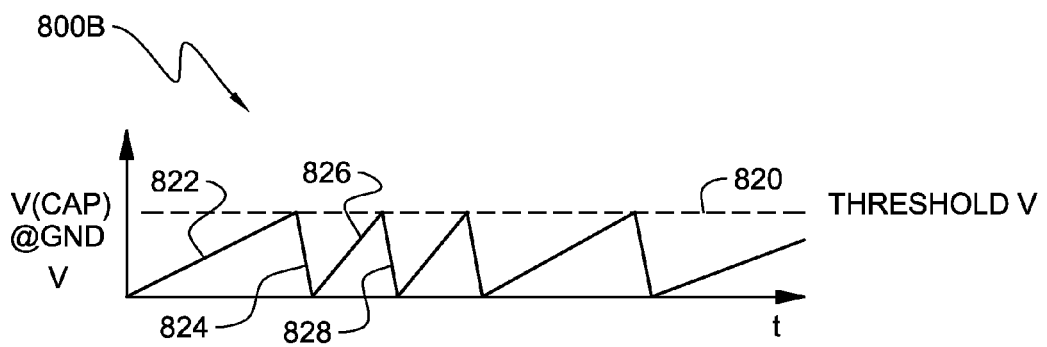
FIG. 8B is a graphical illustration of the voltage measured across the capacitor connected at the ground level of an electronic circuit, in accordance with an embodiment of the invention.

Turning to FIGS. 8A and 8B, reference numeral 800A depicts a flowchart outlining a method for recycling and reusing charge in an electronic or electrical circuit used in an electrical system, such that, the power supply current and power consumption is reduced in the electrical system, whereas, reference numeral 800B depicts the voltage measured across a capacitor connected at the ground level of an electronic circuit. The method begins with step 802, where the electronic circuit, such as, an integrated circuit used in a chip or microprocessor is powered up. In step 804, a first capacitor, for instance, the first capacitor 120, CAP1, shown in FIGS. 1, 2A-5A, is electrically connected, via a switching sub-circuit, at a power supply of the electronic circuit, whereas, a second capacitor, for instance, the second capacitor 130, CAP2, shown in FIGS. 1, 2A-5A, is electrically connected, via the switching sub-circuit, at a ground level of the electronic circuit. Further, in step 806, the switching sub-circuit measures the voltage $V_{CAP}$ across the capacitor connected at the ground level of the electronic circuit, in this case, the voltage $V_{CAP2}$ across the second capacitor connected at the ground level is measured. In an embodiment, the circuit ground-level control voltage is measured using a voltage level comparator, which turns on and off a control signal for turning a switch on and off in the capacitor. In step 808, the switching sub-circuit determines whether or not the voltage across the capacitor (second capacitor $V_{CAP2}$) connected at the ground level for collecting charge has a measured voltage $V_{CAP}$ that is greater than a circuit ground-level control voltage, $V_{th}$ predetermined for that type of capacitor. If the voltage across the capacitor $V_{CAP}$ connected at the ground level of the electronic circuit is determined in step 808 to be not greater than the circuit ground-level control voltage $V_{th}$ (that is, the capacitor fails the circuit ground-level control voltage measurement), then the method returns to step 806, where the switching sub-circuit takes another measurement of the voltage across the capacitor at a later point-in-time. However, on the other hand, if the voltage across the capacitor $V_{CAP}$ connected at the ground level of the electronic circuit is determined in step 808 to be greater than the circuit ground-level control voltage $V_{th}$ (that is, the capacitor passes the circuit ground-level control voltage measurement), then in step 810, the switching sub-circuit switches the electrical connection of the first capacitor from being electrically connected to the power supply of the circuit to being electrically connected to the ground level of the electronic circuit. Simultaneously, the switching sub-circuit switches the electrical connection of the second capacitor from being electrically connected to the ground level of the electronic circuit to electrically being connected to the power supply of the electronic circuit. The method continues with steps 806 through step 810 being repeated in the electronic circuit. As such, the capacitor that is now electrically connected via the switching sub-circuit to the power supply can discharge the charge collected into the power supply for reuse by the electronic circuit, whereas, the capacitor that is now connected to the ground level of the electronic circuit can collect charge due to current flow in the electronic circuit. Accordingly, FIG. 8B, reference numeral 800B, shows the voltage V measured across a capacitor (shown on the vertical axis of FIG. 8B) over time (shown on the horizontal axis of FIG. 8B). In particular, FIG. 8B shows that the voltage measured across a capacitor connected at the ground level of an electronic circuit rises (as shown by ascending lines 822 and 826, representing the charge mode) to a circuit ground-level control voltage (indicated by dotted line 820), and then the voltage across the capacitor falls (as shown by descending lines 824 and 828, representing the discharge mode) when the capacitor is electrically disconnected from the ground level and re-connected at the power supply of the electronic circuit. Thus, the charging and discharging of the capacitor is repeated over time in the electronic circuit, as shown by the graph in FIG. 8B.

Accordingly, multiple capacitors are used to collect and discharge current charges in an alternative fashion in the electronic circuit, such that, a capacitor is switched from the bottom of the logic (where charges are collected) to the top of the logic (where charges are poured back into the circuit). If there was only one capacitor, then at the top of the circuit, the circuit is not operational because there is no ground path that can consume the current and charges. However, by using at least two capacitors that switch between charging and discharging, there is always a ground path to the circuit. Further, the circuit with multiple capacitors nearly halves the current, which means that the power consumption is nearly halved. Additionally, the original circuit design does not have to be modified to perform charge sharing and/or recycling and is applicable to both digital and analog circuits.

The foregoing descriptions of specific embodiments of the present invention have been presented for the purpose of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

The invention claimed is:

1. An apparatus for recycling and reusing charge in an electrical system, comprising:
  at least one capacitor coupled to a circuit block in an electronic circuit within an electrical system powered by a power supply, said at least one capacitor being configured to collect current charge consumed by said circuit block when set to a charge collection mode;
  detection means configured to detect a fully charged state in said at least one capacitor when said at least one capacitor is fully charged;
  first switching means configured to allow, once said fully charged state is detected, said at least one capacitor to switch to a discharge mode for discharging said current charge collected back into said power supply for reuse by said electrical system and
  second switching means configured to allow, after said at least one capacitor has fully discharged said current charge collected, said at least one capacitor to switch back to said charge collection mode, wherein said current charge is recycled and reused by said electrical system.

2. The apparatus according to claim 1, wherein said at least one capacitor is configured to collect said current charge at a local ground of said circuit block, and wherein said at least one capacitor is configured to discharge said current charge into said power supply, and wherein said current charge comprises at least one of: leakage current charge and active current charge.

3. The apparatus according to claim 2, wherein said detection means comprises a voltage level comparator configured to detect a circuit ground-level control voltage measured that signifies when said at least one capacitor is fully charged, and wherein said voltage regulator is further configured to detect a fully discharged state by comparing said circuit ground-level control voltage to an initial voltage measured that signifies when said at least one capacitor is fully charged.

4. The apparatus according to claim 3, wherein each of said first switching means and said second switching means comprises at least two electrical switches, one switch of said at least two electrical switches being connected to a respective local ground of said circuit for collecting current charge consumed by said electronic circuit and controlled by a first signal and another switch of said at least two electrical switches being connected to a respective power supply for discharging said current charge collected into said electronic circuit and controlled by a second signal.

5. The apparatus according to claim 4, further comprising:
  at least two capacitors, each of said at least two capacitors being configured to collect current charge in a respective charge collection mode and being configured to discharge said current charge collected in a respective discharge mode, wherein each capacitor of said at least two capacitors alternates collecting said current charge and discharging said current charges, whereby continuous operation of said electrical system is maintained.

6. The apparatus according to claim 5, wherein power consumption utilized by said electrical system is reduced by about 50%.

7. An electronic circuit for minimizing power consumption by recycling and reusing charge in an electrical system, comprising:
  a power supply configured to provide supply voltage to an electronic circuit;
  a circuit block; and
  at least two switched capacitors coupled to said circuit block, each capacitor of said at least two switched capacitors being configured to collect current charge when set to a charge collection mode and being configured to discharge said current charge collected when set to a charge discharge mode, said each capacitor of said at least two switched capacitors being configured to alternate between said charge collection mode and said charge discharge mode, wherein when a first capacitor of said at least two capacitors is set to said charge collection mode, said first capacitor is connected at a local ground level of said circuit block for collecting said current charge, a second capacitor of said at least two capacitors is set to said discharge collection mode, said second capacitor is connected at a supply level of said circuit block for discharging said current charge collected into said power supply for use by said electronic circuit, and wherein alternating collecting and discharging of said current charge by said at least two switched capacitors minimizes power consumption of said electrical system and maintains continuous operation of said electronic circuit.

8. The electronic circuit according to claim 7, wherein said current charge comprises at least one of: leakage current charge and active current charge.

9. The electronic circuit according to claim 8, wherein a respective capacitor of said at least two switched capacitors is further configured to establish an initial voltage that signifies when said respective capacitor is fully discharged, whereby said respective capacitor can switch back to said charge collection mode for collecting said current charge consumed by said electronic circuit.

10. The electronic circuit according to claim 9, wherein said respective capacitor of said at least two switched capacitors is further configured to detect a circuit ground-level control voltage that signifies when said respective capacitor is fully charged, whereby said respective capacitor can switch back to said charge discharge mode for discharging said current charge into said electronic circuit.

11. The electronic circuit according to claim 10, wherein said power consumption by said electrical system is reduced by about 50%.

12. A method for recycling and reusing charge within an electronic circuit, said method comprising the steps of:
  providing at least one switched capacitor coupled to a circuit block of an electronic circuit powered by a power supply, said at least one switched capacitor being configured for switching from a charge collection mode to a charge discharge mode;
  collecting current charge, using said at least one switched capacitor connected in said charge collection mode to a local ground level of said power supply for collecting said current charge consumed by said electronic circuit, said current charge comprising at least one of: leakage current charge and active current charge;
  detecting when said at least one switched capacitor connected at said local ground level has achieved a fully charged state in said charge collection mode; and
  connecting, in said charge discharge mode, said at least one switched capacitor to a supply level of said power supply for discharging said current charge collected into said circuit block of said electronic circuit, wherein said current charge is recycled within said electronic circuit as a result of alternating configuration of said at least one switched capacitor from said charge collection mode to said charge discharge mode.

13. The method according to claim 12, wherein said providing step further comprises the step of:

providing at least two switched capacitors coupled to said circuit block of said electronic circuit, each capacitor of said at least two switched capacitors being configured to be switched from said charge collection mode to said charge discharge mode, wherein a first capacitor of said at least two switched capacitors is connected at said local ground level, in said charge collection mode, for collecting said current charge consumed by said circuit block of said electronic circuit, and wherein a second capacitor of said at least two switched capacitors is connected at said supply level, in said discharge mode, for discharging said current charge collected into said circuit block of said electronic circuit.

14. The method according to claim 13, wherein said providing step further comprises the steps of:

switching, when said first capacitor of said at least two switched capacitors is fully charged, connection of said first capacitor from said local ground level to said supply level of said circuit block of said electronic circuit for discharging said current charge collected into said circuit block of said electronic circuit; and switching, when said second capacitor of said at least two switched capacitors is fully discharged, connection of said second capacitor from said supply level to said local ground level of said circuit block to collect said current charge from said circuit block of said electronic circuit, wherein continuous operation of said electronic circuit is maintained.

15. The method according to claim 14, wherein each capacitor of said at least two switched capacitors is further configured to establish an initial voltage that signifies when a respective capacitor of said at least two switched capacitors is fully discharged, whereby said respective capacitor can switch back to a charge collection mode for collecting said current charge consumed by said electronic circuit.

16. The method according to claim 15, wherein each capacitor of said at least two switched capacitors is further configured to establish a circuit ground-level control voltage that signifies when a respective capacitor of said at least two switched capacitors is fully charged, whereby said respective capacitor can switch back to a discharge mode for discharging said current charge into said electronic circuit.

17. The method according to claim 16, wherein said power consumption by said electronic circuit is reduced by about 50%.

18. A method for minimizing power consumption by recycling and reusing charge in an electrical system, said method comprising the steps of:

providing at least two switched capacitors coupled to an electronic circuit in an electrical system powered by a power supply, each capacitor of said at least two switched capacitors being configured to be switched from a charge collection mode, for collecting current charge consumed by said electronic circuit, to a charge discharge mode for discharging said current charge collected into said electronic circuit, said current charge being charge consumed by said electronic circuit;

collecting a respective current charge consumed by said electronic circuit using a first capacitor of said at least two switched capacitors, while simultaneously discharging a respective current charge collected by a second capacitor of said at least two switched capacitors, said first capacitor being connected in said charge collection mode at a local ground level of said electronic circuit, while said second capacitor is connected in said charge discharge mode to a supply level of said electronic circuit for reusing and recycling said current charge discharged into said electronic circuit; and detecting when said first capacitor connected at said local ground level has achieved a fully charged state and disconnecting said first capacitor from said local ground level and reconnecting said first capacitor to said supply level of said electronic circuit for discharging said current charge collected into said electronic circuit and detecting when said second capacitor connected at said supply level has achieved a fully discharged state and disconnecting said second capacitor from said supply level and reconnecting said second capacitor to said local ground level of said electronic circuit for collecting said current charge consumed by said electronic circuit, wherein said current charge is recycled within said electronic circuit as a result of alternating connection of a respective capacitor of said at least two switched capacitors from said charge collection mode to said charge discharge mode.

19. The method according to claim 18, wherein said current charge comprises at least one of: leakage current charge and active current charge.

20. The method according to claim 19, wherein a respective capacitor of said at least two switched capacitors is configured to detect a circuit ground-level control voltage measured that signifies when said respective capacitor is fully charged, and wherein said respective capacitor is further configured to detect a fully discharged state by comparing said circuit ground-level control voltage to an initial voltage measured that signifies when said respective capacitor is fully charged.

21. The method according to claim 20, wherein a respective capacitor of said at least two switched capacitors is connected to at least two electrical ports, and wherein one electrical port of said at least two electrical ports is connected to a respective supply level of said electronic circuit and a second electrical port of said at least two electrical ports is connected to a respective local ground level of said electronic circuit.

22. The method according to claim 21, wherein said detecting step further comprises the step of:

detecting, using a voltage level comparator, when said first capacitor connected at said local ground level has achieved a fully charged state and when said second capacitor connected at said supply level has achieved a fully discharged state.

23. The method according to claim 22, wherein use of said at least two switched capacitors maintains continuous operation of said electronic circuit.

24. The method according to claim 23, wherein power consumption of said electrical system is reduced by about 50%.

* * * * *